Figure 1:
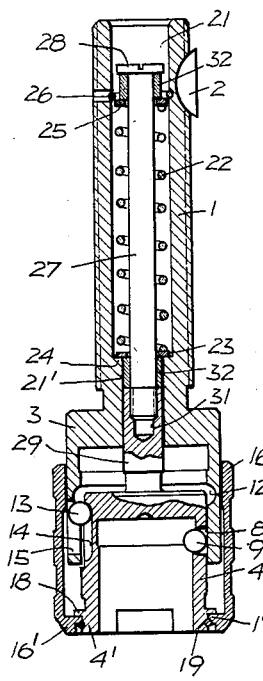

May 28, 1963 O. BILZ 3,091,473
LENGTH COMPENSATION DEVICE FOR QUICK-CHANGE CHUCKS
Filed Oct. 10, 1961

INVENTOR.
Otto Bilz
BY

United States Patent Office 3,091,473
Patented May 28, 1963

3,091,473
LENGTH COMPENSATION DEVICE FOR QUICK-CHANGE CHUCKS
Otto Bilz, Holderlinweg 61, Esslingen (Neckar), Germany
Filed Oct. 10, 1961, Ser. No. 144,258
Claims priority, application Germany Oct. 26, 1960
4 Claims. (Cl. 279—76)

The present invention relates to a length compensation device for quick-change chucks which are frequently used in machine tools for mounting reduction cones thereon, for example, quick-change inserts, chuck inserts or the like. In the prior art it is known to provide a quick-change chuck with a tool-receiving socket, hereafter simply called a tool socket, into which the shaft of a reduction cone or the like may be inserted, and to provide such a tool socket with radial bores and with locking elements, for example, locking balls, in these bores. When the chuck is in the locking position, these balls engage into an annular groove in the shaft of the reduction cone or the like, and they are then maintained in this engaging position by a locking sleeve which is slidable in the axial direction relative to the tool socket. In the prior quick-change chucks of this type the locking sleeve is slidable by hand along the outside of the socket sleeve, and it is provided at the inside of its wall facing toward the tool socket with an annular groove which, when the tool socket is in the open position, is located in front of the radial bores containing the locking elements so that these elements may then yield as required to permit the shaft of the reduction cone or the like to be withdrawn from the tool socket.

In order to allow the quick-change chuck especially for tapping operations to shift in the axial direction relative to the work spindle of a machine tool so that differences in the feeding speed, for example, of a tap and the work spindle of the machine tool will thereby be compensated, it is also known to provide a shaft for connecting the quick-change chuck to the spindle of a machine tool and to connect the actual chuck containing the tool socket to this shaft in a manner so as to be slidable in the axial direction against the action of a compensating spring which is mounted in an axial bore of the shaft. Such a length compensation for a quick-change chuck requires, however, a considerable distance in the axial direction which is very undesirable since the quick-change chuck then takes up a considerable space and the bearing of the machine spindle is then also subjected to an increased radial load.

It is an object of the present invention to overcome these disadvantages of the known length compensation devices for quick-change chucks. This is attained according to the invention by mounting the locking sleeve on the shaft of the quick-change chuck so as to form a part of this shaft in which the tool socket is slidable in the axial direction, by transmitting the rotary movements from the locking sleeve to the tool socket by the provision of suitable driving elements which are disposed in axial grooves in the opposite surfaces of the locking sleeve and tool socket, and by connecting the tool socket to the compensating spring by means of a bolt which is disposed within the axial bore of the shaft of the quick-change chuck. This structure achieves the result that the tool socket also forms the axially movable part of the length compensation device so that in the axial direction no additional space will be required for the length compensation.

A further advantage which is attained by the invention consists in the fact that the quick-change chuck which is provided with the new length compensation means requires a considerably smaller number of individual parts than any of the known quick-change chucks which are provided with length compensation means. This means that a quick-change chuck according to the invention may be produced much more simply and at a lower expense and may also be repaired more easily. Since a quick-change chuck which is provided with the length compensation means according to the invention has the same length as one of the known quick-change chucks without length compensating means, it is now possible to carry out machining operations which require a length compensation, for example, tapping operations, which previously could not be carried out for lack of space. It is now also possible, for example, on turret lathes, to apply a quick-change chuck with a length compenastion together with conventional quick-change chucks which do not require a length compensation, and without any danger that the respective tool in the chuck which is provided with the length compensation according to the invention will project beyond the other tools.

Another important feature of the invention resides in the extremely simple manipulation of the new quick-change chuck. This is attained by mounting the driving elements which preferably consist of balls in axially extending slots in the locking sleeve and by providing the chuck with an outer manipulating sleeve which covers up these axially extending slots toward the outside and which is connected to the tool socket so as to be rotatable but not slidable in the axial direction relative thereto. The manipulating sleeve will then maintain the locking balls in the axially extending slots of the locking sleeve, and it may at the same time serve for shifting the tool socket by hand to the open or releasing position of the chuck.

Another important feature of a preferred embodiment of the invention consists in mounting the length compensation spring between two abutments in the axial bore of the shaft, and in providing the bolt which passes through this spring and is connected to the tool socket near both ends with abutments for the engagement of the opposite ends of the spring. In this manner it is possible to provide the length compensation spring with the required initial tension and to attain a length compensation in both directions from a central position by a compression of this biased spring. Still another feature of the invention provides the abutments for the engagement of the compensating spring to be designed so as to be exchangeable on the bolt. The length compensation may then be effected either by only permitting the tool socket to move into the locking sleeve or by only permitting it to move out of the locking sleeve, or by permitting the tool socket to move in either direciton from a central position.

Figure 2:
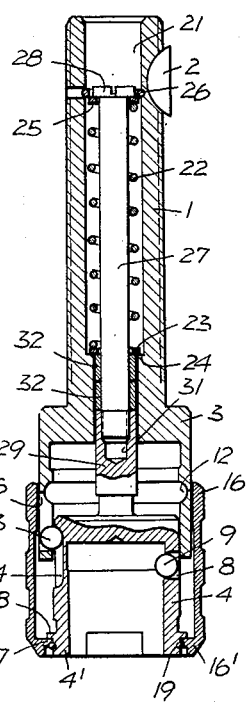
Figure 3:
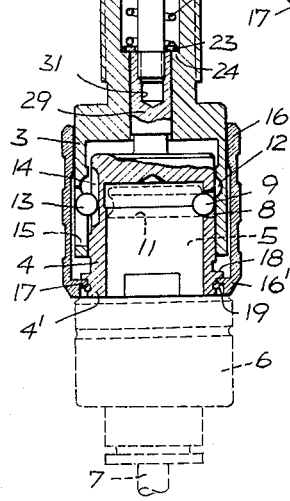

These and further objects, features, and advantages of the present invention will become more clearly apparent from the following detailed description thereof which is to be read with reference to the accompanying drawings in which:

FIGURES 1 to 3 show axial cross sections of one preferred embodiment of the quick-change chuck according to the invention in three different positions of adjustment.

Referring to the drawings, the quick-change chuck according to the invention consists of a shaft 1 for connecting the chuck to the spindle of a machine tool, not shown. In order to insure a reliable transmission of the rotary movements of the machine spindle to shaft 1, the latter is provided near its free end with a spline 2 which is adapted to be inserted into an axial groove in a bore of the machine spindle.

The other end of shaft 1 forms a locking socket 3 in which a tool socket 4 is mounted so as to be slidable in the axial direction in socket 3. As indicated in dotted lines in FIGURE 3, this second socket 4 is adapted to receive a shaft 5 of a conventional reduction cone or the like 6 for a particular tool, for example, a tap 7. Tool socket 4 is provided, for example, with three radial bores 8 at uniform distances from each other into which balls 9 are inserted which serve as locking members and are adapted to engage into an annular groove 11 in shaft 5 of the reduction cone 6 when the quick-change chuck is in the closed or locking position, in which balls 9 are maintained in groove 11 by the wall of locking socket 3. This socket 3 is provided at the inside with an annular groove 12 which, when the quick-change chuck is in the open position, is in alignment with the radial bores 8 in tool socket 4 so that the locking balls 9 will then enter into this annular groove 12 and thus release the shaft 5 of the reduction cone or collet 6.

In order to transmit the rotary movements from the locking socket 3 on shaft 1 to the tool socket 4, additional balls 13 are provided which serve as driving members and engage, for example, into three equally spaced axial grooves 14 in the outer side of the wall of tool socket 4 and also into slots 15 in locking socket 3 which are cut radially through the wall of the latter and extend in the axial direction in radial alignment with the axial grooves 14. In order to maintain the driving balls 13 in this engaging position, locking socket 3 carries an outer manipulating sleeve 16 which covers the axial slots 15 and is manually shiftable in the axial direction along the locking socket 3. The lower end portion 16' of sleeve 16 is connected to the lower end portion 4' of tool socket 4 so as to be rotatable but not slidable in the axial direction relative thereto. For this purpose, the lower end portion 16' of sleeve 16 has an inwardly projecting flange 17 which engages into an annular groove which is formed between an outer flange 18 and a spring ring 19 on the lower end 4' of socket 4. Thus, when the reduction cone 6 is to be removed from the quick-change chuck, the tool socket 4 may be shifted by means of the outer sleeve 16 in the axial direction to its open or releasing position in which the locking balls 9 engage in the annular groove 12.

Shaft 1 is further provided with an axial bore 21 for receiving a length compensation spring 22, one end of which engages through a washer 23 upon an inner shoulder 24 on a reduced extension 21' of bore 21, while the other end engages through a washer 25 upon a spring ring 26 which is snapped into an annular groove in the wall of bore 21. In this manner it is possible to insert the length compensation spring 22 with the necessary initial pressure into bore 21.

Tool socket 4 is firmly but removably secured to one end of a long bolt 27 which extends through bore 21 and through the entire length compensation spring 22 and is provided on its outer end with a head 28 which has a diameter larger than the inner diameter of washer 25. Bolt 27 is longer than spring 22 so as to permit it to be adjusted to three different positions relative to the spring as illustrated in FIGURES 1 to 3, respectively. For removably securing bolt 27 to tool socket 4, the latter is provided with a shaft 29 which is slidable axially in the reduced part 21' of bore 21 and has a tapped bore 31 into which the threaded end of bolt 27 is screwed.

In order to maintain the tool socket 4 by means of the length compensation spring 22 in a certain position from which it can only be displaced against the compressive force of spring 22, two spacing sleeves 32 which are preferably of the same length are placed on bolt 27. These spacing sleeves 32 may either be applied, as shown in FIGURE 1, upon the opposite ends of bolts 27 between washer 23 and shaft 29 of the tool socket and washer 25 and the bolt head 28 or, as shown in FIGURE 2, both spacing sleeves 32 may be applied upon one end of bolt 27 between shaft 29 and washer 23 or, as shown in FIGURE 3, upon the other end of bolt 27 between the bolt head 28 and washer 25. Thus, if the spacing sleeves are arranged as shown in FIGURE 1, the basic position of tool socket 4 will be located approximately at the center of the area of its movability so that socket 4 can then carry out length compensating movements in both directions, that is, by shifting into the locking socket 3 and also out of socket 3. If the spacing sleeves 32 are, however, applied as shown in FIGURES 2 and 3, the tool socket 4 is located approximately at one or the other of its end positions and it can therefore carry out compensating movements only in the direction into or out of tool socket 3, although obviously for a distance which is twice as long as if the arrangement of spring sleeves 32 according to FIGURE 1 is applied.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In a quick-change chuck having a shaft and an axial bore within said shaft, a tool socket for receiving the shaft of a reduction cone or tool having an annular groove, said tool socket having radial bores, locking members within said radial bores adapted to engage into said annular groove, a locking sleeve rigidly secured to said chuck shaft and slidable in the axial direction relative to said tool socket for maintaining said locking members in the engaging position, means for connecting said tool socket to said chuck shaft comprising a compensating spring within said axial bore of said chuck shaft, said tool socket being slidable in the axial direction within said chuck shaft against the action of said compensating spring, said locking sleeve and said tool socket having axially extending grooves in the adjacent wall surfaces thereof, driving elements disposed within said axial grooves and connecting said locking sleeve with said tool socket for transmitting rotary movements from said locking sleeve to said tool socket, and a bolt passing through said axial bore of said chuck shaft and connecting said tool socket to said compensating spring.

2. In a quick-change chuck having a shaft and an axial bore within said shaft, a tool socket for receiving the shaft of a reduction cone or tool having an annular groove, said tool socket having radial bores, locking members within said radial bores adapted to engage into said annular groove, a locking sleeve rigidly secured to said chuck shaft and slidable in the axial direction relative to said tool socket for maintaining said locking members in the engaging position, means for connecting said tool socket to said chuck shaft comprising a compensating spring within said axial bore of said chuck shaft, said tool socket being slidable in the axial direction within said chuck shaft against the action of said compensating spring, said tool socket having axially extending grooves in the outer wall surface thereof, said locking sleeve having axially extending slots in the wall thereof, driving elements disposed within said axial grooves and slots and connecting said locking sleeve with said tool socket for transmitting rotary movement from said locking sleeve to said tool socket, and a manipulating sleeve surrounding said locking sleeve and covering up said axial slots in said locking sleeve, and means for connecting said manipulating sleeve to said tool socket so as to be rotatable but not slidable in the axial direction relative to said tool socket.

3. In a quick-change chuck having a shaft and an axial bore within said shaft, a tool socket for receiving the shaft of a reduction cone or tool having an annular groove, said tool socket having radial bores, locking members within said radial bores adapted to engage into said annular groove, a locking sleeve rigidly secured to said chuck shaft and slidable in the axial direction relative to said tool socket for maintaining said locking members in the engaging position, means for connecting said tool socket to said chuck shaft comprising a compensating spring within said axial bore of said chuck shaft, said tool socket being slidable in the axial direction within said chuck shaft against the action of said compensating spring, said locking sleeve and said tool socket having axially extending grooves in the adjacent wall surfaces thereof, driving elements disposed within said axial grooves and connecting said locking sleeve with said tool socket for transmitting rotary movements from said locking sleeve to said tool socket, means for removably mounting the two ends of said spring in a fixed end position within said axial bore of said chuck shaft, and a bolt passing axially through said spring and connecting the outer end of said spring to said tool socket so as to be capable of compressing said spring away from said end position and from one of said mounting means.

4. In a quick-change chuck having a shaft and an axial bore within said shaft, a tool socket for receiving the shaft of a reduction cone or tool having an annular groove, said tool socket having radial bores, locking members within said radial bores adapted to engage into said annular groove, a locking sleeve rigidly secured to said chuck shaft and slidable in the axial direction relative to said tool socket for maintaining said locking members in the engaging position, means for connecting said tool socket to said chuck shaft comprising a compensating spring within said axial bore of said chuck shaft, said tool socket being slidable in the axial direction within said chuck shaft against the action of said compensating spring, said locking sleeve and said tool socket having axially extending grooves in the adjacent wall surfaces thereof, driving elements disposed within said axial grooves and connecting said locking sleeve with said tool socket for transmitting rotary movements from said locking sleeve to said tool socket, means for removably mounting the two ends of said spring in a fixed end position within said axial bore of said chuck shaft, a bolt passing axially through said spring and connecting the outer end of said spring to said tool socket so as to be capable of compressing said spring away from said end position and from one of said mounting means, and means for adjusting the compression of said spring and its position on said bolt comprising spacing means adapted to be mounted on said bolt and to be interposed between said spring and at least one end of said bolt.

References Cited in the file of this patent
UNITED STATES PATENTS

| | | |
|---|---|---|
| 2,459,649 | Jahrl | Jan. 18, 1949 |
| 2,733,926 | Colton | Feb. 7, 1956 |
| 2,751,229 | Schultz | June 19, 1956 |
| 2,807,473 | Kiehne | Sept. 24, 1957 |